(12) United States Patent
Park et al.

(10) Patent No.: US 9,622,144 B2
(45) Date of Patent: Apr. 11, 2017

(54) APPARATUS AND METHOD FOR ROUTING DATA IN MOBILE COMMUNICATION SYSTEM

(71) Applicant: Samsung Electronics Co., Ltd., Suwon-si, Gyeonggi-do (KR)

(72) Inventors: Jung-Shin Park, Seoul (KR); Yegin Alper, Istanbul (TR); Dae-Gyun Kim, Seongnam-si (KR); Won-Il Roh, Yongin-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 14/073,171

(22) Filed: Nov. 6, 2013

(65) Prior Publication Data

US 2014/0126473 A1 May 8, 2014

(30) Foreign Application Priority Data

Nov. 6, 2012 (KR) .................. 10-2012-0125013

(51) Int. Cl.

| | |
|---|---|
| *H04W 40/20* | (2009.01) |
| *H04W 88/18* | (2009.01) |
| *H04W 80/04* | (2009.01) |
| *H04W 8/08* | (2009.01) |
| *H04W 12/10* | (2009.01) |
| *H04L 29/12* | (2006.01) |
| *H04L 29/06* | (2006.01) |

(52) U.S. Cl.
CPC ......... *H04W 40/20* (2013.01); *H04W 80/045* (2013.01); *H04W 88/182* (2013.01); *H04L 61/1588* (2013.01); *H04L 63/126* (2013.01); *H04W 8/082* (2013.01); *H04W 12/10* (2013.01)

(58) Field of Classification Search
CPC ................. H04W 40/20; H04W 80/00–80/045
See application file for complete search history.

(56) References Cited

U.S. PATENT DOCUMENTS

| | | | |
|---|---|---|---|
| 2006/0251055 A1* | 11/2006 | Monette et al. | ............. 370/352 |
| 2009/0016364 A1 | 1/2009 | Krishnan | |
| 2010/0008300 A1* | 1/2010 | Wu et al. | ....................... 370/328 |
| 2010/0208706 A1* | 8/2010 | Hirano et al. | ................. 370/332 |
| 2010/0214982 A1 | 8/2010 | Hirano et al. | |
| 2010/0220738 A1 | 9/2010 | Sarikaya | |
| 2010/0272062 A1 | 10/2010 | Velev et al. | |
| 2011/0080866 A1 | 4/2011 | Chan et al. | |

OTHER PUBLICATIONS

Yegin et al., On Demand Mobility Management draft-yegin-dmm-ondemand-mobility-00, DMM Working Group, Jul. 3, 2013.

* cited by examiner

*Primary Examiner* — Yaotang Wang
(74) *Attorney, Agent, or Firm* — Jefferson IP Law, LLP

(57) ABSTRACT

A method for routing data by a Corresponding Mobility Agent (CMA) in a mobile communication system is provided. The method includes managing mobility for a Mobile Station (MS) with a Mobile Access Gateway (MAG), and routing a data packet between a Corresponding Node (CN) and the MS based on a location of the MS, wherein the CMA is mapped to an application server which provides an application service.

35 Claims, 12 Drawing Sheets

APPARATUS AND METHOD FOR ROUTING DATA IN MOBILE COMMUNICATION SYSTEM

CROSS-REFERENCE TO RELATED APPLICATION(S)

This application claims the benefit under 35 U.S.C. §119(a) of a Korean patent application filed on Nov. 6, 2012 in the Korean Intellectual Property Office and assigned Serial No. 10-2012-0125013, the entire disclosure of which is hereby incorporated by reference.

TECHNICAL FIELD

The present disclosure relates to an apparatus and a method for routing data in a mobile communication system. More particularly, the present disclosure relates to an apparatus and a method for routing data using a Corresponding Mobility Agent (CMA) mapped to an application server in a mobile communication system.

BACKGROUND

FIG. 1 schematically illustrates a process for routing a data packet in a mobile communication system according to the related art.

Referring to FIG. 1, the mobile communication system includes a Corresponding Node (CN) 111, a home agent 113, the Internet 115, an anchor Base Station (BS) 117, a serving BS 119, and a Mobile Station (MS) 121.

As illustrated in FIG. 1, a data packet should be routed through the home agent 113 in order for the MS 121 to receive a service through the CN 111. A security problem and a traffic load due to an excessive mobile traffic may occur since the data packet is routed through the home agent 113 in order for the MS 121 to receive the service through the CN 111.

If a direct routing between the MS 121 and the CN 111 is considered in the mobile communication system, an update for a function of the CN 111 is necessary, and this may not satisfy a hardware implementation cost criterion for the CN 111.

Therefore, a need exists for routing data between an MS and a CN with the shortest data path without additional cost increase and system modification.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for routing data in a mobile communication system.

Another aspect of the present disclosure is to provide an apparatus and a method for routing data through the shortest data path per application in a mobile communication system.

Another aspect of the present disclosure is to provide an apparatus and a method for routing a data packet using a Corresponding Mobility Agent (CMA) mapped to an application server in a mobile communication system.

In accordance with an aspect of the present disclosure, a CMA in a mobile communication system is provided. The CMA includes a controller configured to manage mobility for a Mobile Station (MS) with a Mobile Access Gateway (MAG), and a transmitter/receiver configured to route a data packet between a Corresponding Node (CN) and the MS through the MAG based on a location of the MS, wherein the CMA is mapped to an application server which provides an application service.

In accordance with another aspect of the present disclosure, a MAG in a mobile communication system is provided. The MAG includes a controller configured to manage mobility for an MS with a CMA, and a transmitter/receiver configured to route a data packet between a CN and the MS through the CMA based on a location of the MS, wherein the CMA is mapped to an application server which provides an application service.

In accordance with another aspect of the present disclosure, a Local Mobility Anchor (LMA) in a mobile communication system is provided. The LMA includes a controller configured to manage mobility for an MS with a CMA, wherein the CMA is mapped to an application server which provides an application service.

In accordance with another aspect of the present disclosure, a CMA in a mobile communication system is provided. The CMA includes a transmitter/receiver configured to receive a binding update message including a Home of Address (HoA) Internet Protocol (IP) address of an MS, a MAG IP address corresponding to an IP address of a CN, an IP address of an LMA for the MS, and a crypto token from a MAG, and to perform a data packet transmission/reception operation for the MS with the MAG and the CN, wherein the CMA is mapped to an application server which provides an application service.

In accordance with another aspect of the present disclosure, a MAG in a mobile communication system is provided. The MAG includes a receiver configured to receive a crypto token for an MS from an LMA or an old MAG, and to receive a data packet which targets a CN from the MS, a controller configured to map an IP address of the CN to an IP address of a CMA which is mapped to an application server which provides an application service, and a transmitter configured to transmit a binding update message including an HoA IP address of the MS, a MAG IP address corresponding to the IP address of the CN, an IP address of the LMA, and the crypto token to the CMA, wherein the transmitter and the receiver are further configured to perform a data packet transmission/reception operation for the MS with the CN.

In accordance with another aspect of the present disclosure, a MAG in a mobile communication system is provided. The MAG includes a transmitter, a receiver, and a controller, wherein the receiver is configured to receive a crypto token for an MS from an LMA or an old MAG, wherein the transmitter and the receiver are configured to set up a tunnel with the old MAG or the LMA, after the receiver receives a data packet which targets a CN from the MS, the controller is configured to map an IP address of the CN to an IP address of a CMA which is mapped to an application server which provides an application service, wherein the transmitter is configured to transmit a binding update message including an HoA IP address of the MS, a MAG IP address corresponding to the IP address of the CN, an IP address of the LMA, and the crypto token to the CMA, and wherein the transmitter and the receiver are further configured to perform a data packet transmission/reception operation for the MS with the CN.

In accordance with another aspect of the present disclosure, a MAG in a mobile communication system is provided. The MAG includes a transmitter, a receiver, and a controller, wherein the receiver is configured to receive a crypto token for an MS from an LMA or an old MAG, wherein the transmitter and the receiver are configured to set up a tunnel with the old MAG or the LMA, wherein the receiver is configured to receive a binding trigger message including an HoA IP address, an IP address of a CN, and a MAG IP address corresponding to the IP address of the CN, wherein the transmitter is configured to transmit a binding update message including the HoA IP address of the MS, the MAG IP address, the IP address of the LMA, and a crypto token to a CMA, and wherein the transmitter and the receiver are further configured to perform a data packet transmission/reception operation for the MS with the CMA.

In accordance with another aspect of the present disclosure, a CMA in a mobile communication system is provided. The MAG includes a receiver configured to receive a binding update message including an HoA IP address of an MS, a MAG IP address corresponding to an IP address of a CN, an IP address of an LMA for the MS, and a crypto token from a MAG, a controller configured to perform a Network Address Translation (NAT) operation after the receiver receives a data packet from the MAG, and a transmitter configured to transmit the data packet through the CN and the MAG to the MS after the controller performs the NAT operation.

In accordance with another aspect of the present disclosure, a method for routing data by a CMA in a mobile communication system is provided. The method includes managing mobility for an MS with a MAG, and routing a data packet between a CN and the MS through the MAG based on a location of the MS, wherein the CMA is mapped to an application server which provides an application service.

In accordance with another aspect of the present disclosure, a method for routing data by a MAG in a mobile communication system is provided. The method includes managing mobility for an MS with a CMA, and routing a data packet between a CN and the MS through the CMA based on a location of the MS, wherein the CMA is mapped to an application server which provides an application service.

In accordance with another aspect of the present disclosure, a method for routing data by a CMA in a mobile communication system is provided. The method includes managing mobility for an MS with an LMA, and routing a data packet between a CN and the MS through a MAG based on a location of the MS, wherein the CMA is mapped to an application server which provides an application service.

In accordance with another aspect of the present disclosure, a method for routing data by a CMA in a mobile communication system is provided. The method includes receiving a binding update message including an HoA IP address of an MS, a MAG IP address corresponding to an IP address of a CN, an IP address of an LMA for the MS, and a crypto token from a MAG, and performing a data packet transmission/reception operation for the MS with the MAG and the CN, wherein the CMA is mapped to an application server which provides an application service.

In accordance with another aspect of the present disclosure, a method for routing data by a MAG in a mobile communication system is provided. The method includes acquiring a crypto token for an MS from an LMA or an old MAG, upon receiving a data packet which targets a CN from the MS, mapping an IP address of the CN to an IP address of a CMA which is mapped to an application server which provides an application service, transmitting a binding update message including an HoA IP address of the MS, a MAG IP address corresponding to the IP address of the CN, an IP address of the LMA, and the crypto token to the CMA, and performing a data packet transmission/reception operation for the MS with the CN.

In accordance with another aspect of the present disclosure, a method for routing data by a MAG in a mobile communication system is provided. The method includes acquiring a crypto token for an MS from an LMA or an old MAG, setting up a tunnel with the old MAG or the LMA, upon receiving a data packet which targets a CN from the MS, mapping an IP address of the CN to an IP address of a CMA which is mapped to an application server which provides an application service, transmitting a binding update message including an HoA IP address of the MS, a MAG IP address corresponding to the IP address of the CN, an IP address of the LMA, and the crypto token to the CMA, and performing a data packet transmission/reception operation for the MS with the CN.

In accordance with another aspect of the present disclosure, a method for routing data by a MAG in a mobile communication system is provided. The method includes acquiring a crypto token for an MS from an LMA or an old MAG, setting up a tunnel with the old MAG or the LMA, receiving a binding trigger message including an HoA IP address, an IP address of a CN, a MAG IP address corresponding to the IP address of the CN, transmitting a binding update message including the HoA IP address of the MS, the MAG IP address, the IP address of the LMA, and a crypto token to a CMA, and performing a data packet transmission/reception operation for the MS with the CMA.

In accordance with another aspect of the present disclosure, a method for routing data by a CMA in a mobile communication system is provided. The method includes receiving a binding update message including an HoA IP address of an MS, a MAG IP address corresponding to an IP address of a CN, an IP address of an LMA for the MS, and a crypto token from a MAG, upon receiving a data packet from the MAG, performing a NAT operation, and after performing the NAT operation, transmitting the data packet through the CN and the MAG to the MS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
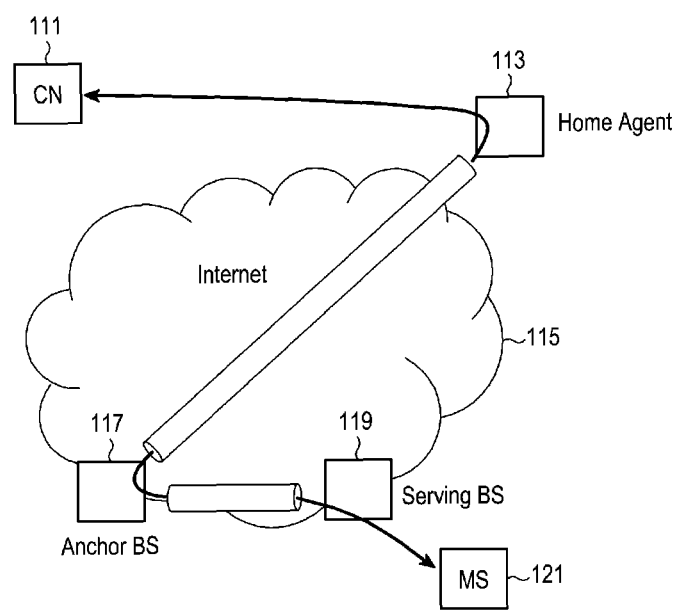
FIG. 1 schematically illustrates a process for routing a data packet in a mobile communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although ordinal numbers, such as "first", "second", and so forth, will be used to describe various components, those components are not limited by the terms. The terms are used only for distinguishing one component from another component. For example, a first component may be referred to as a second component and similarly, a second component may also be referred to as a first component, without departing from the teaching of the inventive concept. The term "and/or" used herein includes any and all combinations of one or more of the associated listed items.

The terminology used herein is for the purpose of describing embodiments only and is not intended to be limiting of the embodiments. As used herein, the singular forms are intended to include the plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology. As long as the terms are not defined obviously, they are not ideally or excessively analyzed as formal meanings.

An embodiment of the present disclosure proposes an apparatus and a method for routing data in a mobile communication system.

Another embodiment of the present disclosure proposes an apparatus and a method for routing data through the shortest data path per application in a mobile communication system.

Another embodiment of the present disclosure proposes an apparatus and a method for routing a data packet using a Corresponding Mobility Agent (CMA) mapped to an application server in a mobile communication system.

An apparatus and a method proposed in an embodiment of the present disclosure may be applied to various mobile communication systems, such as a Mobile Internet Protocol (Mobile IP) system, a Long Term Evolution (LTE) mobile communication system, a Long Term Evolution-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a 3$^{rd}$ Generation Project Partnership 2 (3GPP2), a Wideband Code Division Multiple Access (WCDMA) mobile communication system proposed in a 3GPP2, a Code Division Multiple Access (CDMA) mobile communication system proposed in a 3GPP2, an Institute of Electrical and Electronics Engineers (IEEE) mobile communication system, an Evolved Packet System (EPS), and the like.

Figure 2:
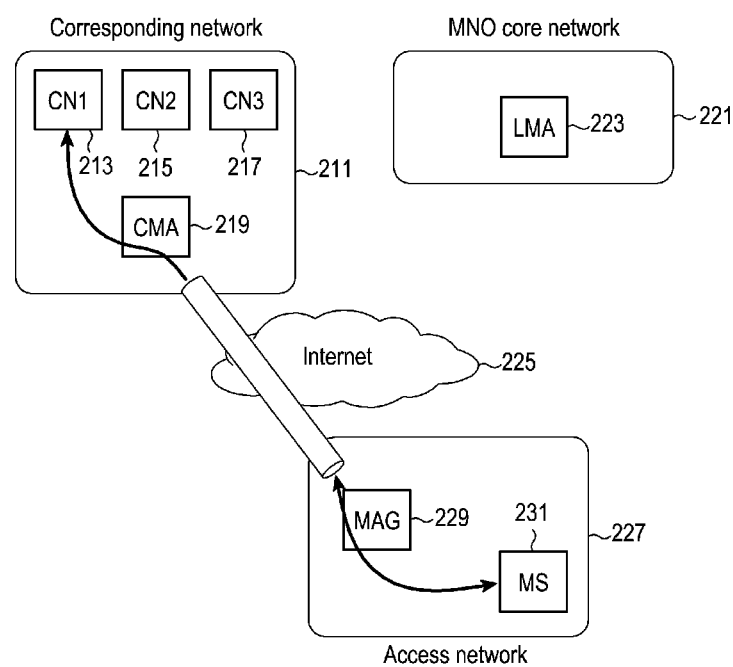
FIG. 2 schematically illustrates a process for routing data using a Corresponding Mobility Agent (CMA) located at a corresponding network in a mobile communication system according to an embodiment of the present disclosure.

FIG. 2 schematically illustrates a process for routing data using a CMA located at a corresponding network in a mobile communication system according to an embodiment of the present disclosure.

Referring to FIG. 2, the mobile communication system includes a corresponding network 211, a Mobile Network Operator (MNO) core network 221, the Internet 225, and an access network 227. The corresponding network 211 includes a plurality of Corresponding Nodes (CNs), e.g., three CNs, i.e., a CN1 213, a CN2 215, and a CN3 217, and a CMA 219. The CMA 219 is mapped to a related application server which provides an application service, such as Facebook©, YouTube©, PANDORA.TV©, Netflix©, and the like. For example, the CMA 219 may be mapped to the related application server one to one. However, it will be understood by those of ordinary skill in the art that the CMA 219 may be mapped to a plurality of application servers.

The MNO core network 221 includes a Local Mobility Anchor (LMA) 223, and the access network 227 includes a Mobile Access Gateway (MAG) 229 and a Mobile Station (MS) 231. Here, the LMA 223 is operated as a Serving-GateWay (S-GW), and the MAG 229 is operated as a Packet data network-GateWay (P-GW).

The CMA 219 manages mobility of the MS 231 and directly routes a data packet to the MS 231 through the MAG 229. As illustrated in FIG. 2, since the CMA 219 directly routes the data packet to the MS 231 through the MAG 229, unnecessary data routing may be decreased through a Home Agent (HA) like a mobile communication system of the related art.

Figure 3:
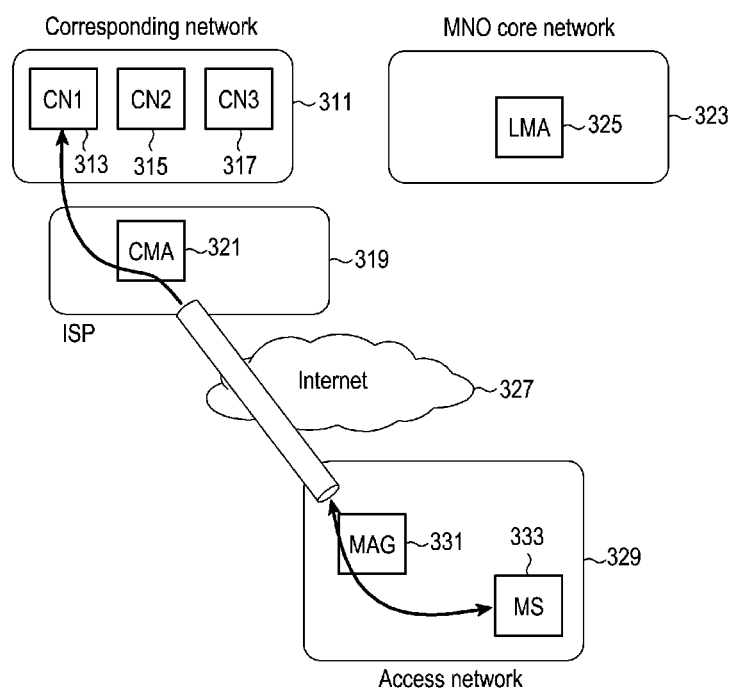
FIG. 3 schematically illustrates a process for routing a data packet using a CMA located at an Internet Service Provider (ISP) which serves a corresponding network in a mobile communication system according to an embodiment of the present disclosure.

FIG. 3 schematically illustrates a process for routing a data packet using a CMA located at an Internet Service Provider (ISP) which serves a corresponding network in a mobile communication system according to an embodiment of the present disclosure.

Referring to FIG. 3, the mobile communication system includes a corresponding network 311, an MNO core network 323, an ISP 319, the Internet 327, and an access network 329. The corresponding network 311 includes a plurality of CNs, e.g., three CNs, i.e., a CN1 313, a CN2 315, and a CN3 317. The ISP 319 includes a CMA 321, and the CMA 321 is mapped to an application server one to one. The access network 329 includes a MAG 331 and an MS 333. Here, the MAG 331 is operated as a P-GW. For example, the CMA 321 may be mapped to the application server one to one. However, it will be understood by those of ordinary skill in the art that the CMA 321 may be mapped to a plurality of application servers.

The CMA 321 manages mobility of the MS 333 and directly routes a data packet to the MS 333 through the MAG 331. As illustrated in FIG. 3, since the CMA 321 directly routes the data packet to the MS 333 through the MAG 331, unnecessary data routing may be decreased through an HA like a mobile communication system of the related art.

Figure 4:
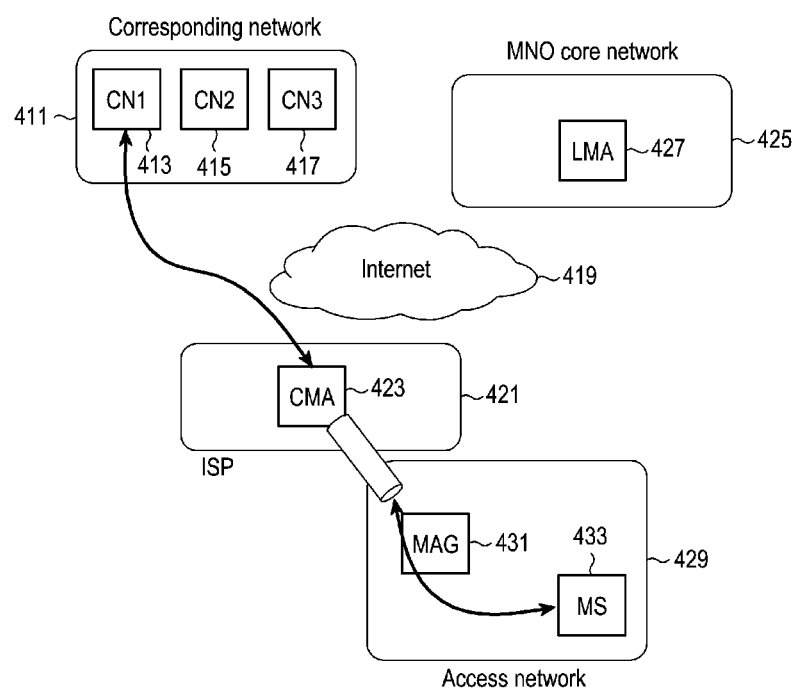
FIG. 4 schematically illustrates a process for routing a data packet using a CMA located at an ISP which serves an access network in a mobile communication system according to an embodiment of the present disclosure.

FIG. 4 schematically illustrates a process for routing a data packet using a CMA located at an ISP which serves an access network in a mobile communication system according to an embodiment of the present disclosure.

Referring to FIG. 4, the mobile communication system includes a core network 411, the Internet 419, an ISP 421, an MNO core network 425, and an access network 429.

The core network 411 includes a plurality of CNs, e.g., three CNs, i.e., a CN1 413, a CN2 415, and a CN3 417. The ISP 421 includes a CMA 423, and the CMA 423 is mapped to an application server one to one. The access network 429 includes a MAG 431 and an MS 433. Here, the MAG 431 is operated as a P-GW. For example, the CMA 423 may be mapped to the application server one to one. However, it will be understood by those of ordinary skill in the art that the CMA 423 may be mapped to a plurality of application servers.

The CMA 423 manages mobility of the MS 433 and directly routes a data packet to the MS 433 through the MAG 431. As illustrated in FIG. 4, since the CMA 423 directly routes the data packet to the MS 433 through the MAG 431, unnecessary data routing may be decreased through an HA like a mobile communication system of the related art.

Figure 5:
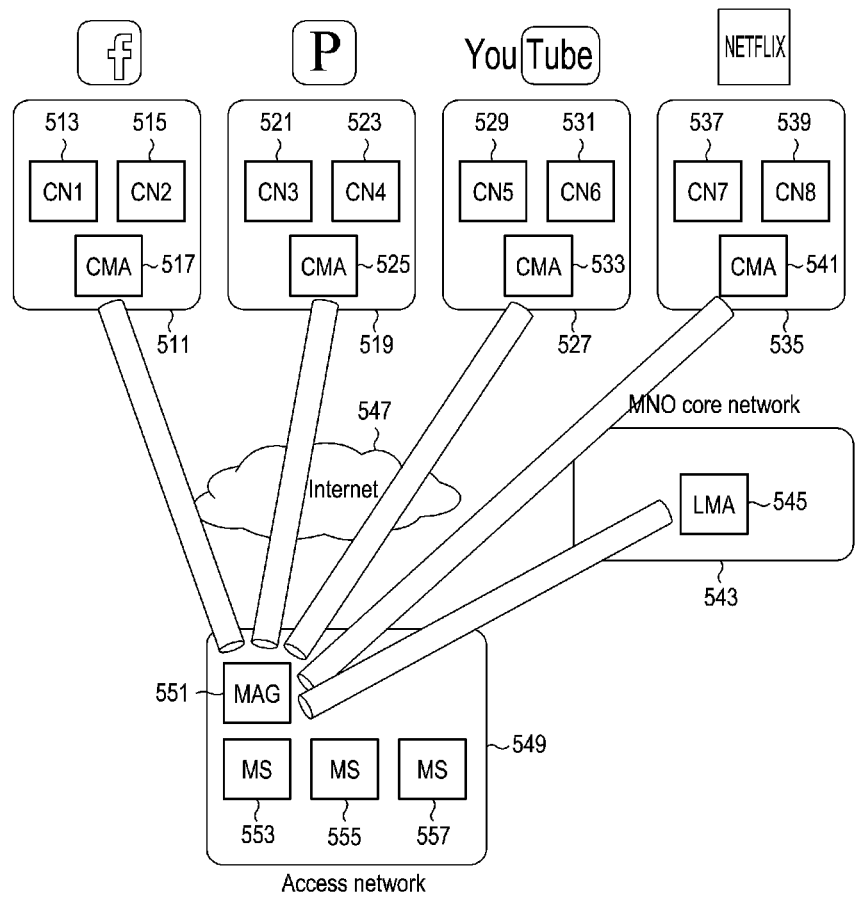
FIG. 5 schematically illustrates a process for routing a data packet using a CMA located at a corresponding network in a mobile communication system according to an embodiment of the present disclosure.

FIG. 5 schematically illustrates a process for routing a data packet using a CMA located at a corresponding network in a mobile communication system according to an embodiment of the present disclosure.

Referring to FIG. 5, the mobile communication system includes a plurality of corresponding networks, e.g., four corresponding networks 511, 519, 527, 535, an MNO core network 543, the Internet 547, and an access network 549. The corresponding network 511 includes a CN1 513, a CN2 515, and a CMA 517, and the CMA 517 is mapped to a Facebook© server. The corresponding network 519 includes a CN3 521, a CN4 523, and a CMA 525, and the CMA 525 is mapped to a PANDORA.TV© server. The corresponding network 527 includes a CN5 529, a CN2 531, and a CMA 533, and the CMA 533 is mapped to a YouTube© server. The corresponding network 535 includes a CN7 537, a CN8 539, and a CMA 541, and the CMA 541 is mapped to a Netflix© server.

The MNO core network 543 includes an LMA 545, and the access network 549 includes a MAG 551, and MSs 553, 555, 557. The MAG 551 provides a service to the MSs 553, 555, 557 through the CMAs 517, 525, 533, 541 and the LMA 545. Here, the MAG 551 is operated as an S-GW, and the LMA 545 is operated as a P-GW. Each of the CMAs 517, 525, 533, 541 may directly route a data packet to the MSs 553, 555, 557, so unnecessary data routing may be decreased through an HA like a mobile communication system of the related art. In FIG. 5, each of the CMAs 517, 525, 533, 541 is mapped to one application server, that is, the CMA 517 is mapped to a Facebook© server, the CMA 525 is mapped to a PANDORA.TV© server, the CMA 533 is mapped to a YouTube© server, and the CMA 541 is mapped to a Netflix© server. However, it will be understood by those of ordinary skill in the art that each of the CMAs 517, 525, 533, 541 may be mapped to a plurality of application servers.

Figure 6:
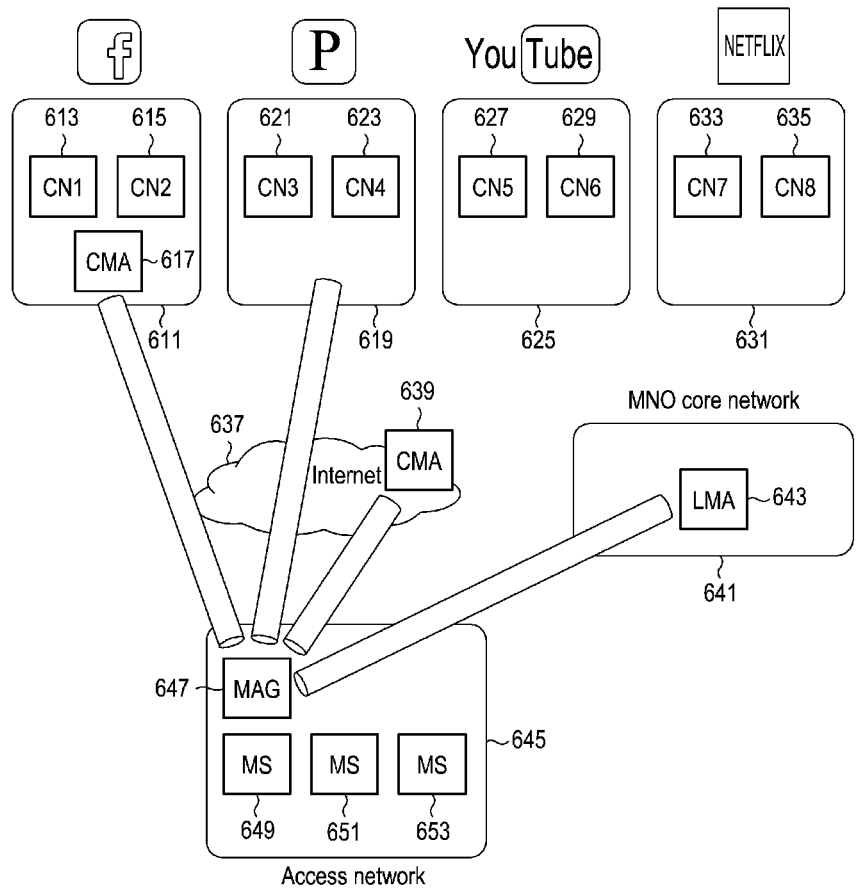
FIG. 6 schematically illustrates a process for routing a data packet using a CMA located at an ISP which serves a corresponding network in a mobile communication system according to an embodiment of the present disclosure.

FIG. 6 schematically illustrates a process for routing a data packet using a CMA located at an ISP which serves a corresponding network in a mobile communication system according to an embodiment of the present disclosure.

Referring to FIG. 6, the mobile communication system includes a plurality of corresponding networks, e.g., four corresponding networks 611, 619, 625, 631, the Internet 637, an MNO core network 641, and an access network 645. The corresponding network 611 includes a CN1 613, a CN2 615, and a CMA 617, and the CMA 617 is mapped to a Facebook© server. The corresponding network 619 includes a CN3 621 and a CN4 623, and the corresponding network 625 includes a CN5 627 and a CN2 629, and the corresponding network 631 includes a CN7 633 and a CN8 635.

A CMA 639 is located at the Internet 637, the MNO core network 641 includes an LMA 643, the access network 645 includes a MAG 647, and MSs 649, 651, 653. Here, the MAG 643 is operated as a P-GW, and the MAG 647 is operated as an S-GW. The MAG 647 provides a service to the MSs 649, 651, 653 through the CMAs 617 and 639 and the LMA 643. Each of the CMAs 617 and 639 may directly route a data packet to the MSs 649, 651, 653, so unnecessary data routing may be decreased through an HA like a mobile communication system of the related art. In FIG. 6, each of the CMAs 617 and 639 is mapped to one application server, that is, the CMA 617 is mapped to a Facebook© server, and the CMA 639 is mapped to a related server (not shown in FIG. 6). However, it will be understood by those of ordinary skill in the art that each of the CMAs 617 and 639 may be mapped to a plurality of application servers.

Figure 7:
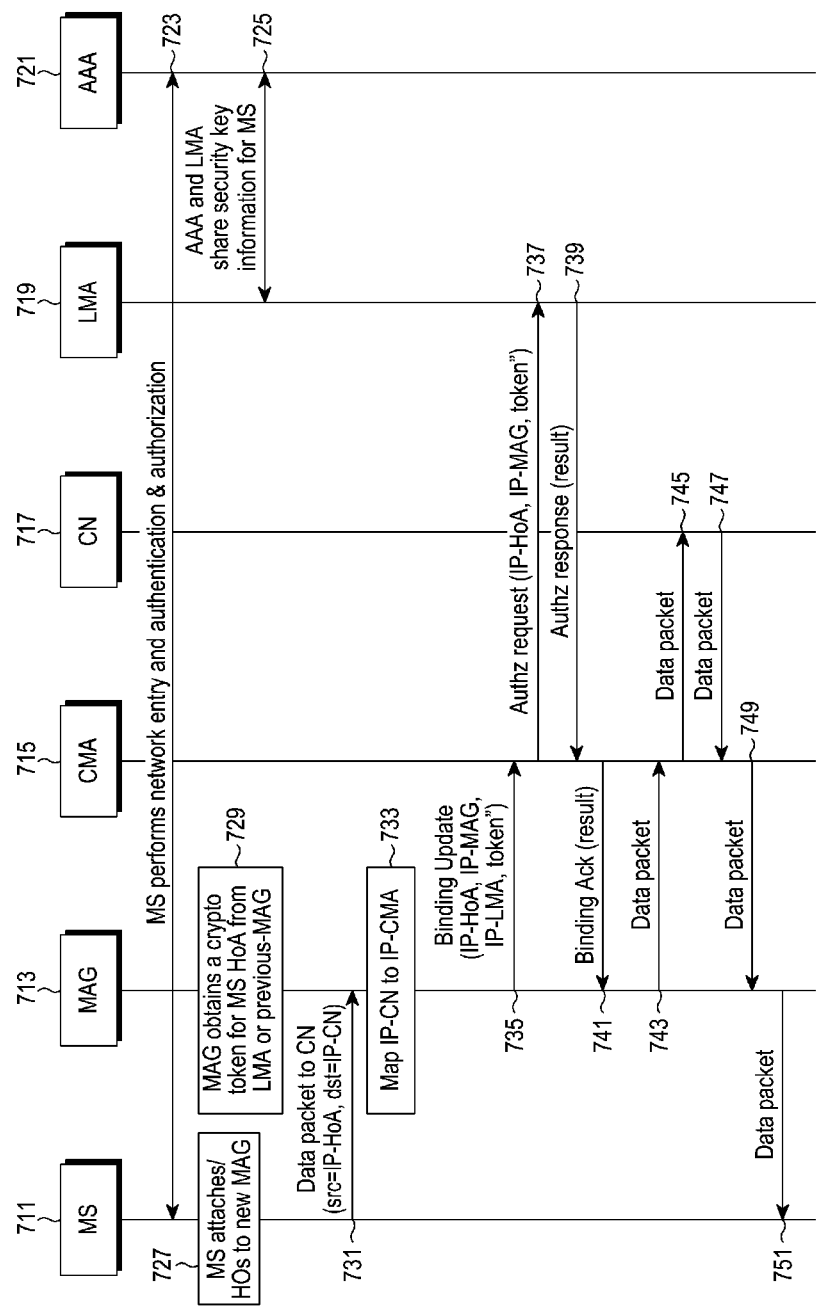
FIG. 7 schematically illustrates a process for routing data through a Mobile Access Gateway (MAG) initiated-CMA direct tunneling in a mobile communication system according to an embodiment of the present disclosure.

FIG. 7 schematically illustrates a process for routing data through a MAG initiated-CMA direct tunneling in a mobile communication system according to an embodiment of the present disclosure.

In a data routing process in FIG. 7, a CMA is on a data path, e.g., an access router or a border gateway, so the CMA may intercept IP traffic targeting a Home of Address (HoA) of an MS. For example, the data routing process in FIG. 7 denotes a data routing process for a case that the CMA is on a traffic path between a CN and the MS.

Referring to FIG. 7, the mobile communication system includes an MS 711, a MAG 713, a CMA 715, a CN 717, an LMA 719, and an Authorization, Authentication, and Accounting (AAA) server 721. Here, the MAG 713 is operated as an S-GW, and the LMA 719 is operated as a P-GW.

The MS 711 performs a network entry procedure and an authentication & authorization procedure with the MAG 713, the CMA 715, the CN 717, the LMA 719, and the AAA server 721 in operation 723. Here, the network entry procedure and the authentication & authorization procedure may be implemented with various forms, and a description will be omitted herein. After the authentication & authorization procedure, the LMA 719 and the AAA server 721 share security key information for the MS 711 in operation 725. Here, the security key information may be implemented with various forms, and a description will be omitted herein.

The MS 711 performs an attach procedure and a handover procedure with a new MAG, i.e., the MAG 713, in operation 727. The MAG 713 acquires a crypto token for an HoA of the MS 711 from the LMA 719 or an old MAG (not shown in FIG. 7) in operation 729.

The MS 711 transmits a data packet to the MAG 713 in operation 731. Source IP address of the data packet is set to an HoA IP address of the MS 711, and destination IP address of the data packet is set to IP address of the CN 717. In FIG. 7, it will be assumed that there is no on-going communication between the MS 711 and the CN 717 if the MS 711 performs the attach procedure. If there is on-going communication between the MS 711 and the CN 717, the MAG 713 knows an old MAG, so the MAG 713 immediately sets up a tunnel after performing operation 729 without waiting for a process in operation 731.

After receiving the data packet from the MS 711, the MAG 713 maps the IP address of the CN 717 to an IP address of the CMA 715 in operation 733. A description of detecting the IP address of the CMA 715 in the MAG 713 will be followed.

The MAG 713 is provisioned a CMA list including information on major CMAs mapped to application servers of major applications, such as Facebook©, YouTube©, PANDORA.TV©, Netflix©, and the like. Here, each of the CMAs may be mapped to a related application server one to one, however, it will be understood by those of ordinary skill in the art that one CMA may be mapped to a plurality of application servers. The MAG 713 knows the LMA 719 and an old MAG, and detects the IP address of the CMA 715 by transmitting an IP probe to the CN 717 using a hop-by-hop option.

For example, the MAG 714 manages a MAG-CMA IP address table in which a MAG IP address of each of a plurality of MAGs is mapped to a CMA IP address, so the MAG 714 may map an IP address of the CN 717 included in a data packet received from the MS 711 to an IP address of the CMA 714 upon receiving the data packet from the MS 711. The MAG-CMA IP address table may be updated by a service provider or an application server. The MAG-CMA IP address table may be updated by a period or based on an event occurrence. The event occurs if a MAG IP address is added, or a CMA IP address is added, or a MAG IP address is deleted, or a CMA IP address is deleted, or a relationship between a MAG IP address and a CMA IP address is changed.

After mapping the IP address of the CN 717 to the IP address of the CMA 715, the MAG 713 transmits a binding update message to the CMA 715 in operation 735. The binding update message includes an HoA IP address, a MAG IP address, an LMA IP address, and a crypto token. Here, the crypto token included in the binding update message in operation 735 is token", the token" will be described with reference to Table 2, so a description will be omitted herein. After receiving the binding update message from the MAG 713, the CMA 715 transmits an authentication request message to the LMA 719 in operation 737). The authentication request message includes the HoA IP address, the MAG IP address, and the crypto token. Here, the crypto token included in the authentication request message in operation 737 is token", the token" will be described with reference to Table 2, so a description will be omitted herein.

After receiving the authentication request message from the CMA 715, the LMA 719 transmits an authentication response message in response to the authentication request message to the CMA 715 in operation 739. The authentication response message includes a result for the authentication operation which the LMA 719 has performed. After receiving the authentication response message from the LMA 719, the CMA 715 transmits a binding ACK ACKnowledgement (ACK) message in response to the binding update message to the MAG 713 in operation 741. The binding ACK message includes a result for a binding update operation.

After receiving the binding ACK message from the CMA 715, the MAG 713 transmits a data packet to the CMA 715 in operation 743. The data packet is stored in a cache after operation 741. For example, in order to rapidly process a data packet transfer, the data packet is piggybacked through the binding update message in operation 735, or is transferred to a longer/centralized path by tunneling the data packet to the LMA 719. Data packets arrived at the MAG 713 after operation 741 will be transferred to the MS 711 through a new path.

After receiving the data packet from the MAG 713, the CMA 715 transmits data packet to the CN 717 in operation 745. After receiving the data packet from the CMA 715, the CN 717 transmits a data packet to the CMA 715 in operation 747. After receiving the data packet from the CN 717, the CMA 715 transmits a data packet to the MAG 713 in operation 749. After receiving the data packet from the CMA 715, the MAG 713 transmits a data packet to the MS 711 in operation 751.

Although FIG. 7 illustrates a process for routing data through a MAG initiated-CMA direct tunneling in a mobile communication system according to an embodiment of the present disclosure, various changes could be made to FIG. 7. For example, while shown as a series of operations, various operations in FIG. 7 could overlap, occur in parallel, occur in a different order, or occur multiple times.

Figure 8:
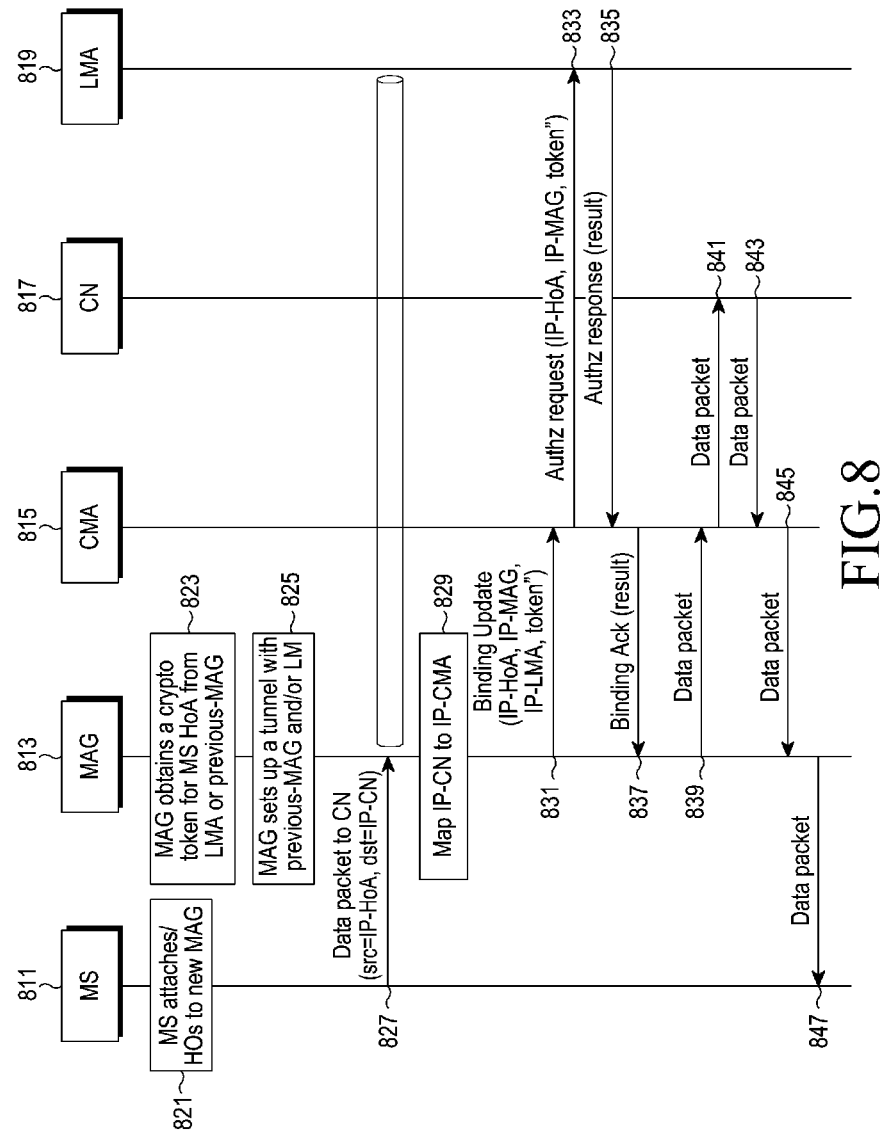
FIG. 8 schematically illustrates a process for routing data through a MAG initiated-on-path CMA in a mobile communication system according to an embodiment of the present disclosure.

FIG. 8 schematically illustrates a process for routing data through a MAG initiated-on-path CMA in a mobile communication system according to an embodiment of the present disclosure.

In a data routing process in FIG. 8, a CMA is on a data path, e.g., an access router or a border gateway, so the CMA may intercept IP traffic targeting an HoA of an MS. For example, the data routing process in FIG. 8 denotes a data routing process for a case that the CMA is on a traffic path between a CN and the MS.

Referring to FIG. 8, the mobile communication system includes an MS 811, a MAG 813, a CMA 815, a CN 817, and an LMA 819. Here, the MAG 813 is operated as an S-GW, and the LMA 819 is operated as a P-GW.

The MS 811 performs an attach procedure and a handover procedure with a new MAG, i.e., the MAG 813, in operation 821. The MAG 813 acquires a crypto token for an HoA of the MS 811 from the LMA 819 or an old MAG (not shown in FIG. 8) in operation 823). Here, the operation of acquiring the crypto token for the HoA of the MS 811 may be implemented with various forms, and a description will be omitted herein. The MAG 813 sets up a tunnel with the old MAG and/or the LMA 819 in operation 825). Here, the process for setting up the tunnel with the old MAG and/or the LMA 819 is performed like a tunnel set up process in a mobile communication system of the related art, so a description will be omitted herein.

The MS 811 transmits a data packet to the MAG 813 in operation 827. Source IP address of the data packet is set to an HoA IP address of the MS 811, and destination IP address of the data packet is set to IP address of the CN 817.

Referring to FIG. 8, it will be assumed that there is no on-going communication between the MS 811 and the CN 817 if the MS 811 performs the attach procedure. If there is on-going communication between the MS 811 and the CN 817, the MAG 813 knows an old MAG, so the MAG 813 immediately sets up a tunnel after performing operation 825 without waiting for a process in operation 827.

After receiving the data packet from the MS 811, the MAG 813 maps the IP address of the CN 817 to an IP address of the CMA 815 in operation 829). A description of detecting the IP address of the CMA 815 in the MAG 813 will be followed.

The MAG 813 is provisioned a CMA list including information on major CMAs mapped to application servers of major applications, such as Facebook©, YouTube©, PANDORA.TV©, Netflix©, and the like. Each of the CMAs may be mapped to a related application server one to one. However, it will be understood by those of ordinary skill in the art that one CMA may be mapped to a plurality of application servers. The MAG 813 knows the LMA 819 and an old MAG, and detects the IP address of the CMA 815 by transmitting an IP probe to the CN 817 using a hop-by-hop option. For example, the MAG 813 manages a MAG-CMA IP address table in which a MAG IP address of each of a plurality of MAGs is mapped to a CMA IP address, so the MAG 813 may map an IP address of the CN 817 included in a data packet received from the MS 811 to an IP address of the CMA 815 upon receiving the data packet from the MS 811.

The MAG-CMA IP address table may be updated by a service provider or an application server. The MAG-CMA IP address table may be updated by a period or based on an event occurrence. The event occurs if a MAG IP address is added, or a CMA IP address is added, or a MAG IP address is deleted, or a CMA IP address is deleted, or a relationship between a MAG IP address and a CMA IP address is changed.

After mapping the IP address of the CN 817 to the IP address of the CMA 815, the MAG 813 transmits a binding update message to the CMA 815 in operation 831. The binding update message includes an HoA IP address, a MAG IP address, an LMA IP address, and a crypto token. Here, the crypto token included in the binding update message in operation 831 is token", the token" will be described with reference to Table 2, so a description will be omitted herein. After receiving the binding update message from the MAG 813, the CMA 815 transmits an authentication request message to the LMA 819 in operation 833. The authentication request message includes the HoA IP address, the MAG IP address, and the crypto token. Here, the crypto token included in the authentication request message in operation 833 is token", the token" will be described with reference to Table 2, so a description will be omitted herein.

After receiving the authentication request message from the CMA 815, the LMA 819 transmits an authentication response message in response to the authentication request message to the CMA 815 in operation 835). The authentication response message includes a result for the authentication operation which the LMA 819 has performed. After receiving the authentication response message from the LMA 819, the CMA 815 transmits a binding ACK message in response to the binding update message to the MAG 813 in operation 837. The binding ACK message includes a result for a binding update operation.

After receiving the binding ACK message from the CMA 815, the MAG 813 transmits a data packet to the CMA 815 in operation 839. The data packet is stored in a cache after operation 837. For example, in order to rapidly process a data packet transfer, the data packet is piggybacked through the binding update message in operation 831, or is transferred to a longer/centralized path by tunneling the data packet to the LMA 819. Data packets which are arrived at the MAG 813 after operation 837 will be transferred to the MS 811 through a new path.

After receiving the data packet from the MAG 813, the CMA 815 transmits a data packet to the CN 817 in operation 841). After receiving the data packet from the CMA 815, the CN 817 transmits a data packet to the CMA 815 in operation 843. After receiving the data packet from the CN 817, the CMA 815 transmits a data packet to the MAG 813 in operation 845. After receiving the data packet from the CMA 815, the MAG 813 transmits a data packet to the MS 811 in operation 847.

Although FIG. 8 illustrates a process for routing data through a MAG initiated-on-path CMA in a mobile communication system according to an embodiment of the present disclosure, various changes could be made to FIG. 8. For example, while shown as a series of operations, various operations in FIG. 8 could overlap, occur in parallel, occur in a different order, or occur multiple times.

Figure 9:
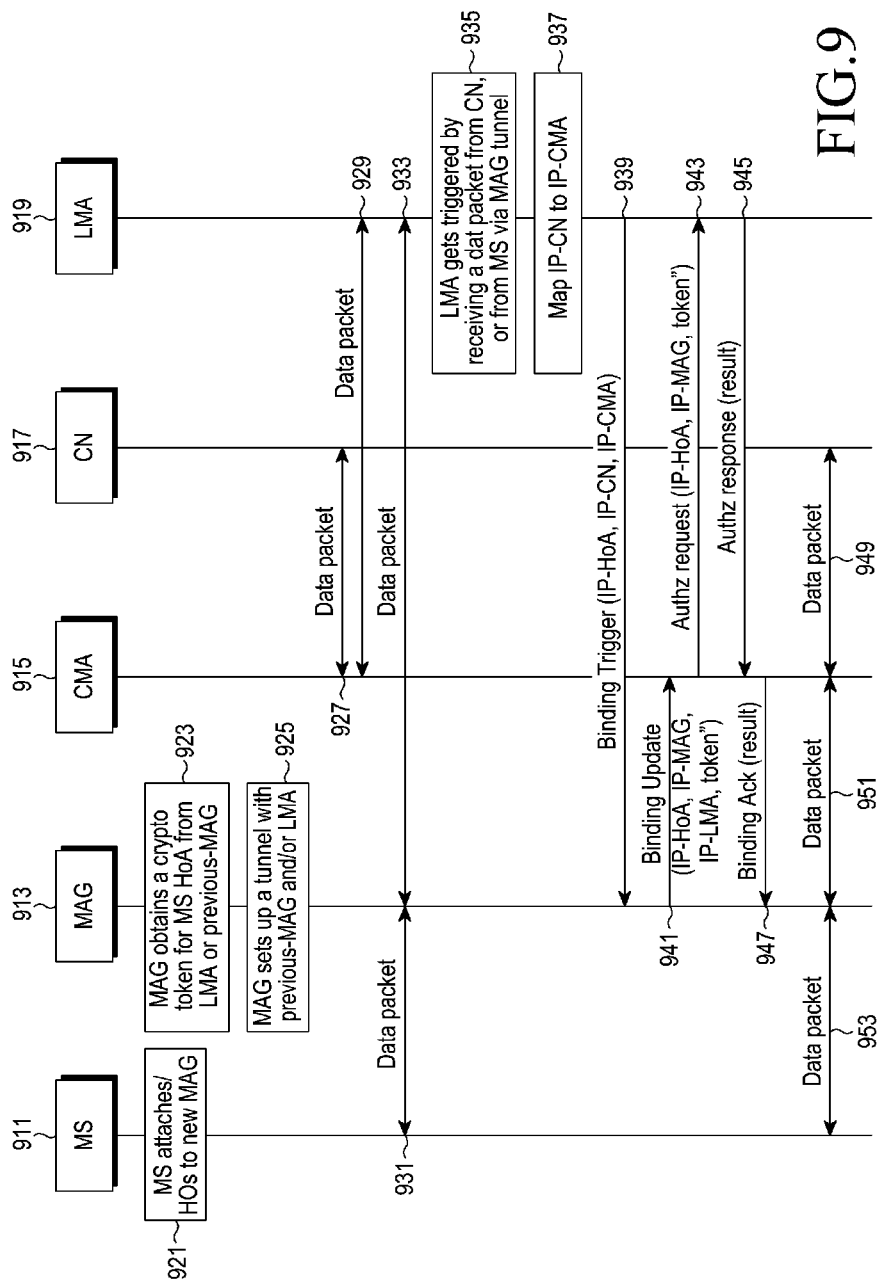
FIG. 9 schematically illustrates a process for routing data through a Local Mobility Anchor (LMA) initiated-on-path CMA in a mobile communication system according to an embodiment of the present disclosure.

FIG. 9 schematically illustrates a process for routing data through an LMA initiated-on-path CMA in a mobile communication system according to an embodiment of the present disclosure.

In a data routing process in FIG. 9, a CMA is on a data path, e.g., an access router or a border gateway, so the CMA may intercept IP traffic targeting an HoA of an MS. For example, the data routing process in FIG. 9 denotes a data routing process for a case that the CMA is on a traffic path between a CN and the MS.

Referring to FIG. 9, the mobile communication system includes an MS 911, a MAG 913, a CMA 915, a CN 917, and an LMA 919. Here, the MAG 913 is operated as an S-GW, and the LMA 919 is operated as a P-GW.

The MS 911 performs an attach procedure and a handover procedure with a new MAG, i.e., the MAG 913, in operation 921. The MAG 913 acquires a crypto token for an HoA of the MS 911 from the LMA 919 or an old MAG (not shown in FIG. 9) in operation 923. Here, the operation of acquiring the crypto token for the HoA of the MS 911 may be implemented with various forms, and a description will be omitted herein. The MAG 913 sets up a tunnel with the old MAG and/or the LMA 919 in operation 925. Here, the process for setting up the tunnel with the old MAG and/or the LMA 919 is performed like a tunnel set up process in a mobile communication system of the related art, so a description will be omitted herein.

Further, a data packet is transmitted/received between the CMA 915 and the CN 917 in operation 927, a data packet is transmitted/received between the CMA 915 and the LMA 919 in operation 929, a data packet is transmitted/received between the MS 911 and the MAG 913 in operation 931, and a data packet is transmitted/received between the MAG 913 and the LMA 919 in operation 933, After receiving the data packet from the CN 917 or the MS 911 through a MAG tunnel, the LMA 919 is triggered in operation 935. The LMA 919 maps an IP address of the CN 917 to an IP address of the CMA 915 in operation 937.

For example, the LMA 919 manages a MAG-CMA IP address table in which a MAG IP address of each of a plurality of MAGs is mapped to a CMA IP address, so the LMA 919 may map an IP address of the CN 917 included in a data packet received from the CN 917 or the MS 911 to an IP address of the CMA 915 upon receiving the data packet from the CN 917 or the MS 911. Here, one CMA may be mapped to a related application server one to one. However, it will be understood by those of ordinary skill in the art that one CMA may be mapped to a plurality of application servers.

The MAG-CMA IP address table may be updated by a service provider or an application server. The MAG-CMA IP address table may be updated by a period or based on an event occurrence. The event occurs if a MAG IP address is added, or a CMA IP address is added, or a MAG IP address is deleted, or a CMA IP address is deleted, or a relationship between a MAG IP address and a CMA IP address is changed.

After mapping the IP address of the CN 917 to the IP address of the CMA 916, the LMA 919 transmits a binding trigger message to the MAG 913 in operation 939. The binding trigger message includes an HoA IP address, a CN IP address, and a CMA IP address. The crypto token may be provided in operation 943 not operation 923.

After receiving the binding trigger message from the LMA 919, the MAG 913 transmits a binding update message to the CMA 915 in operation 941. The binding update message includes an HoA IP address, a MAG IP address, an LMA IP address, and a crypto token. Here, the crypto token included in the binding update message in operation 941 is token", the token" will be described with reference to Table 2, so a description will be omitted herein. After receiving the binding update message from the MAG 913, the CMA 915 transmits an authentication request message to the LMA 919 in operation 943. The authentication request message includes the HoA IP address, the MAG IP address, and the crypto token. Here, the crypto token included in the authentication request message in operation 943 is token", the token" will be described with reference to Table 2, so a description will be omitted herein.

After receiving the authentication request message from the CMA 915, the LMA 919 transmits an authentication response message in response to the authentication request message to the CMA 915 in operation 945. The authentication response message includes a result for the authentication operation which the LMA 919 has performed. After receiving the authentication response message from the LMA 919, the CMA 915 transmits a binding ACK message in response to the binding update message to the MAG 913 in operation 947. The binding ACK message includes a result for a binding update operation.

Further, a data packet is transmitted/received between the CMA 915 and the CN 917 in operation 949, a data packet is transmitted/received between the CMA 915 and the MAG 913 in operation 951, and a data packet is transmitted/received between the MS 911 and the MAG 913 in operation 953.

Although FIG. 9 illustrates a process for routing data through an LMA initiated-on-path CMA in a mobile communication system according to an embodiment of the present disclosure, various changes could be made to FIG. 9. For example, while shown as a series of operations, various operations in FIG. 9 could overlap, occur in parallel, occur in a different order, or occur multiple times.

Figure 10:
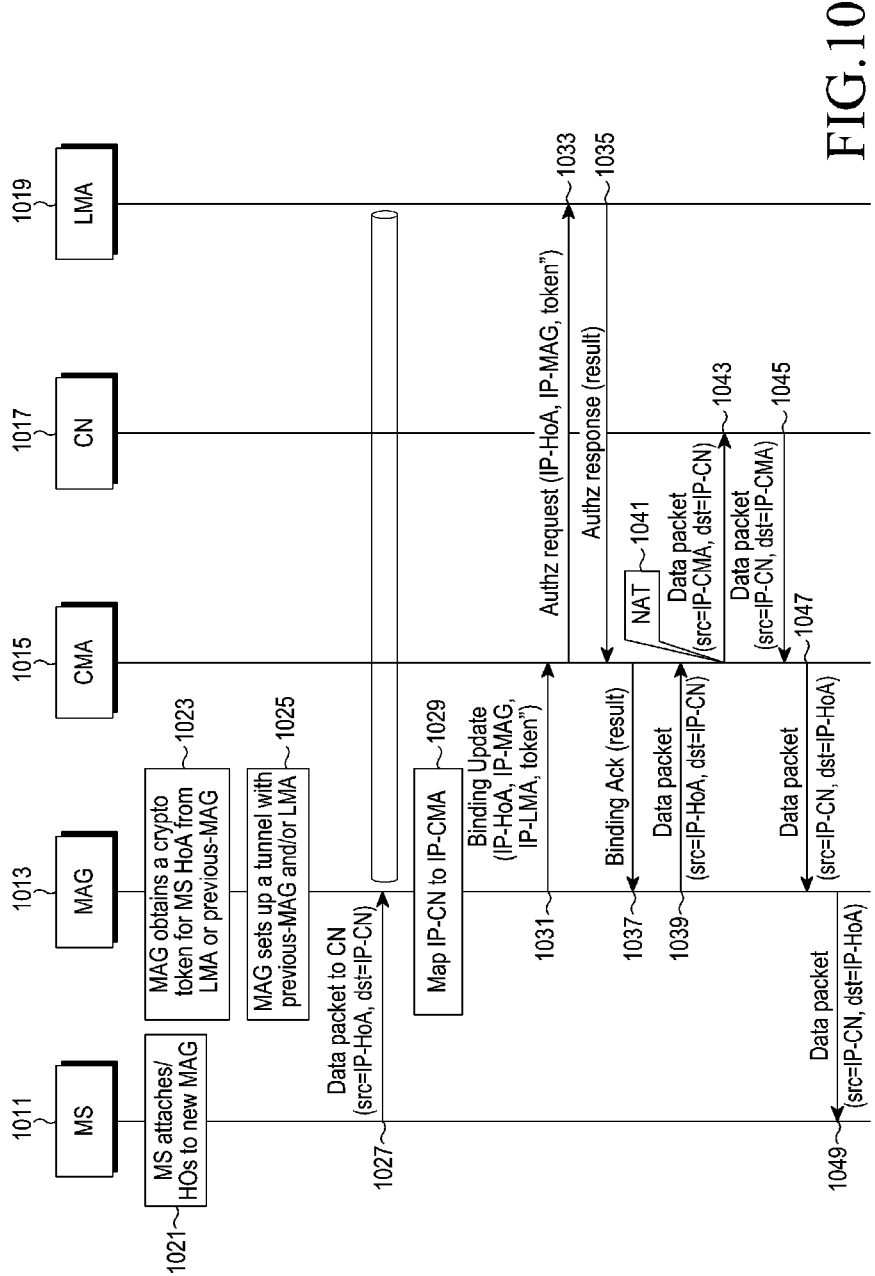
FIG. 10 schematically illustrates a process for routing data through an off-path CMA in a mobile communication system according to an embodiment of the present disclosure.

FIG. 10 schematically illustrates a process for routing data through an off-path CMA in a mobile communication system according to an embodiment of the present disclosure.

A data routing process in FIG. 10 denotes a data routing process in which there is at least one IP path between a MAG/LMA and a CN on which is not through a CMA. For example, the data routing process in FIG. 10 denotes a data routing process through the CMA in which there is no traffic path between the CN and an MS. In order to transfer all IP traffics through the CMA, it may be necessary that there is an IP address of a peer (MS) on the CMA in view of a CN.

Referring to FIG. 10, the mobile communication system includes an MS 1011, a MAG 1013, a CMA 1015, a CN 1017, and an LMA 1019. Here, the MAG 1013 is operated as an S-GW, and the LMA 1019 is operated as a P-GW.

The MS 1011 performs an attach procedure and a handover procedure with a new MAG, i.e., the MAG 1013, in operation 1021. The MAG 1013 acquires a crypto token for an HoA of the MS 1011 from the LMA 1019 or an old MAG (not shown in FIG. 10) in operation 1023. Here, the operation of acquiring the crypto token for the HoA of the MS 1011 may be implemented with various forms, and a description will be omitted herein. The MAG 1013 sets up a tunnel with the old MAG and/or the LMA 1019 in operation 1025. Here, the process for setting up the tunnel with the old MAG and/or the LMA 1019 is performed like a tunnel set up process in a mobile communication system of the related art, so a description will be omitted herein.

The MS 1011 transmits a data packet to the MAG 1013 in operation 1027. Source IP address of the data packet is set to an HoA IP address of the MS 1011, and destination IP address of the data packet is set to IP address of the CN 1017. In FIG. 10, it will be assumed that there is no on-going communication between the MS 1011 and the CN 1017 if the MS 1011 performs the attach procedure. If there is on-going communication between the MS 1011 and the CN 1017, the MAG 1013 knows an old MAG, so the MAG 1013 immediately sets up a tunnel after performing operation 1025 without waiting for a process in operation 1027.

After receiving the data packet from the MS 1011, the MAG 1013 maps the IP address of the CN 1017 to an IP address of the CMA 1015 in operation 1029. A description of detecting the IP address of the CMA 1015 in the MAG 1013 will be followed.

The MAG 1013 is provisioned a CMA list including information on major CMAs mapped to application servers of major applications, such as Facebook©, YouTube©, PANDORA.TV©, Netflix©, and the like. Each of the CMAs may be mapped to a related application server one to one. However, it will be understood by those of ordinary skill in the art that one CMA may be mapped to a plurality of application servers. The MAG 1013 knows the LMA 1019 and an old MAG, and detects the IP address of the CMA 1015 by transmitting an IP probe to the CN 1017 using a hop-by-hop option.

For example, the MAG 1013 manages a MAG-CMA IP address table in which a MAG IP address of each of a plurality of MAGs is mapped to a CMA IP address, so the MAG 1013 may map an IP address of the CN 1017 included in a data packet received from the MS 1011 to an IP address of the CMA 1015 upon receiving the data packet from the MS 1011.

The MAG-CMA IP address table may be updated by a service provider or an application server. The MAG-CMA IP address table may be updated by a period or based on an event occurrence. The event occurs if a MAG IP address is added, or a CMA IP address is added, or a MAG IP address is deleted, or a CMA IP address is deleted, or a relationship between a MAG IP address and a CMA IP address is changed.

After mapping the IP address of the CN 1017 to the IP address of the CMA 1015, the MAG 1013 transmits a binding update message to the CMA 1015 in operation 1031. The binding update message includes an HoA IP address, a MAG IP address, an LMA IP address, and a crypto token. Here, the crypto token included in the binding update message in operation 1031 is token", the token" will be described with reference to Table 2, so a description will be omitted herein. After receiving the binding update message from the MAG 1013, the CMA 1015 transmits an authentication request message to the LMA 1019 in operation 1033. The authentication request message includes the HoA IP address, the MAG IP address, and the crypto token. Here, the crypto token included in the authentication request message in operation 1033 is token", the token" will be described with reference to Table 2, so a description will be omitted herein.

After receiving the authentication request message from the CMA 1015, the LMA 1019 transmits an authentication response message in response to the authentication request message to the CMA 1015 in operation 1035. The authentication response message includes a result for the authentication operation which the LMA 1019 has performed. After receiving the authentication response message from the LMA 1019, the CMA 1015 transmits a binding ACK message in response to the binding update message to the MAG 1013 in operation 1037. The binding ACK message includes a result for a binding update operation.

After receiving the binding ACK message from the CMA 1015, the MAG 1013 transmits a data packet to the CMA 1015 in operation 1039. A source IP address of the data packet is set to an HoA IP address and a destination IP address of the data packet is set to a CN IP address. The data packet is stored in a cache after operation 1037. For example, in order to rapidly process a data packet transfer, the data packet is piggybacked through the binding update message in operation 1031, or is transferred to a longer/centralized path by tunneling the data packet to the LMA 1019. Data packets after operation 1037 will be transferred through a new path.

After receiving the data packet from the MAG 1013, the CMA 1015 performs a Network Address Translation (NAT) operation in operation 1041. After performing the NAT operation, the CMA 1015 transmits a data packet to the CN 1017 in operation 1043. A source IP address of the data packet is set to a CMA IP address and a destination IP address of the data packet is set to a CN IP address.

After receiving the data packet from the CMA 1015, the CN 1017 transmits a data packet to the CMA 1015 in operation 1045. A source IP address of the data packet is set to a CN IP address and a destination IP address of the data packet is set to a CMA IP address.

After receiving the data packet from the CN 1017, the CMA 1015 transmits a data packet to the MAG 1013 in operation 1047. A source IP address of the data packet is set to a CN IP address and a destination IP address of the data packet is set to an HoA IP address. After receiving the data packet from the CMA 1015, the MAG 1013 transmits a data packet to the MS 1011 in operation 1049. A source IP address of the data packet is set to a CN IP address and a destination IP address of the data packet is set to an HoA IP address.

In FIG. 10, if the CMA 1015 allocates an IP address to the MS 1011, the NAT operation in operation 1041 may be omitted. In this case, there is a need for a Common Management Information Protocol (CMIP) operation instead of a Proxy Mobile IP (PMIP) operation, and IP reach ability may not be supported. Therefore, a CN may consider a communication using a CMA IP address not an HoA IP address, and a CMA may be located anywhere. For example, the CMA does not have to become an on-path CMA.

Meanwhile, a security procedure may be performed based on a security rule in Table 1.

TABLE 1

CMA needs to get authorization from home network of HoA before setting up the tunnel, otherwise it may be duped into letting a hijacker steal victim MS traffic.
CMA needs to ask LMA "Is this MAG authorized to receive HoA traffic?"
There may or may not be a pre-established security association between the CMA and LMA
    Not requiring one increases applicability of the solution
Authz request is sent to either the LMA or the HoA
    Sending to HoA
        Increases security, since that way CMA is avoiding to use MAG-provided LMA-IP (which can be spoofed)
        Requires DPI on the LMA, because the packet needs to be acted upon by the LMA, not to be forwarded to the MS
Does the Authz request need to carry any crypto-material?
    Is a token-less solution possible?
        CMA says "Dear LMA, there's a MAG-IP who claims it can serve HoA is contacting me. Is it OK to give HoA traffic to him?"
        This can be answered by the LMA only if it knows the current MAG.
        It may be the case that previous-MAG handed off the MS to new-MAG and the LMA is not notified yet. But during the handoff new-MAG received the Token.
        So, we do need to support crypto-based authorization.

A description of the security procedure in Table 1 is provided below.

In Table 1, it will be understood that a CMA needs to get authorization from a home network of an HoA before setting up a tunnel, otherwise the CMA may be duped into letting a hijacker steal a victim MS traffic.

In Table 1, it will be understood that the CMA needs to ask an LMA that a related MAG is authorized to receive an HoA traffic.

In Table 1, it will be understood that there may or may not be a pre-established security association between the CMA and the LMA. The pre-established security association between the CMA and the LMA does not require increasing applicability of the security procedure.

In Table 1, it will be understood that an authorization request is transmitted to either the LMA or the HoA. If the authorization request is transmitted to the HoA, the CMA avoids a usage of a MAG-provided LMA-IP address, so security increases. Here, the MAG-provided LMA-IP address can be spoofed. A Deep Packet Inspection (DPI) is required on the LMA because a packet needs to be acted upon by the LMA, not to be forwarded to the MS.

In Table 1, it will be understood that there is need for determining that the authorization request needs to carry any crypto-material. In this case, it is determined that a token-less security procedure in which a token is not used is possible. The CMA notifies the LMA that a MAG-IP who claims that the MAG-IP may serve an HoA is contacting the CMA. The CMA asks the LMA that it is possible to give an HoA traffic to the MAG-IP. The LMA may be answered for this only if the LMA knows a current MAG. It may be a case that a previous-MAG handed off the MS to a new-MAG and the LMA is not yet notified. Therefore, there is a need for supporting a crypto-based authorization.

Meanwhile, a security procedure may be performed based on a security rule in Table 2.

TABLE 2

CMA needs to authorize MAG's request to direct IP-HoA traffic
    LMA provides "IP-HoA Authorization Token" to MAG at the time of entry
    Child of Token is passed from old MAG to new MAG at each HO
        Token' = hash (Token, new-IP-MAG)
    Or, a new Token is sent from LMA to new MAG
    MAG sends a child of the received Token to CMA
        Token" = hash (Token, IP-CMA, freshness)
        freshness is a monotonically incrementing value shared between the MAG and LMA
    CMA consults LMA for verification
We deliberately chose call flows where CMA contacts LMA @ IP-HoA, not vice versa. That way CMA ensures the serving LMA Is contacted, not being contacted by a spoofed LMA.

A description of the security procedure in Table 2 is provided below.

In Table 2, it will be understood that a CMA needs to authorize a request of a MAG to direct IP-HoA traffic. An LMA provides an IP-HoA authorization token to the MAG at time of an entry. Further, a child of the IP-HoA authorization token is passed from an old MAG to a new MAG at each HandOver (HO). The child of the IP-HoA authorization token may be expressed as Equation (1).

$$\text{Token'} = \text{hash}(\text{Token}, \text{new-IP-MAG}) \qquad \text{Equation (1)}$$

In Equation (1), Token' denotes the child of the IP-HoA authorization token, hash denotes a hash function, Token denotes the IP-HoA authorization token, and new-IP-MAG denotes an IP address of a new MAG.

On the other hand, the LMA may transmit a new token to the new MAG without providing the child of the IP-HoA authorization token in Equation (1) from the old MAG to the new MAG.

The new MAG transmits a child of the received IP-HoA authorization token child to the CMA. The child of the received IP-HoA authorization token child may be expressed as Equation (2).

$$\text{Token''} = \text{hash}(\text{Token}, \text{IP-CMA}, \text{freshness}) \qquad \text{Equation (2)}$$

In Equation (2), Token" denotes the child of the received IP-HoA authorization token child, hash denotes a hash function, Token denotes the IP-HoA authorization token, IP-CMA denotes an IP address of the CMA, and freshness denotes a monotonically incrementing value shared between the MAG and the LMA. The CMA consults the LMA for verification.

In Table 2, it will be understood that the CMA deliberately selects call flows where the CMA contacts LMA @ IP-HoA, not vice versa, and the CMA ensures a serving LMA is contacted, not being contacted by a spoofed LMA.

Meanwhile, a MAG may detect a CMA IP address as described in Table 3.

TABLE 3

| | Options |
|---|---|
| 1. | MAG is pre-provisioned with a table mapping IP subnets to IP-CMAs |
| 2. | LMA is pre-provisoned with a table mapping IP subnets to IP-CMAs |
| 3. | MAG sends a special probe packet towards the IP-CN. Packet includes a hop-by-hop option to be processed by each router along the path. CMA responds to the probe packet. |
| 4. | DNS lookup on "hostname of CN" returns IP-CMA instead of IP-CN. <br>     One IP-CMA is configured on the CMA for each CN it's serving. <br>     CMA NATs the incoming traffic towards the CN. |

In Table 3, it will be understood that a MAG is pre-provisioned with a table mapping IP subnets to IP-CMAs.

In Table 3, it will be understood that an LMA is pre-provisioned with a table mapping IP subnets to IP-CMAs.

In Table 3, it will be understood that the MAG transmits a special probe packet towards an IP address of a CN, i.e., an IP-CN. The special probe packet includes a hop-by-hop option to be processed by each router along a path. The CMA responds to the special probe packet.

In Table 3, it will be understood that a Domain Name System (DNS) lookup on "hostname of a CN" returns an IP-CMA instead of an IP-CN. Here, one IP-CMA is configured on the CMA for each CN which serves each CN, and the CMA NATs an incoming traffic towards the CN.

Although FIG. 10 illustrates a process for routing data through an off-path CMA in a mobile communication system according to an embodiment of the present disclosure, various changes could be made to FIG. 10. For example, while shown as a series of operations, various operations in FIG. 10 could overlap, occur in parallel, occur in a different order, or occur multiple times.

Meanwhile, entities which join data routing as described above, i.e., an MS, a MAG, a CMA, a CN, an LMA, and an AAA server include a transmitter, a receiver, a controller, and a storage, a description will be followed.

Figure 11:
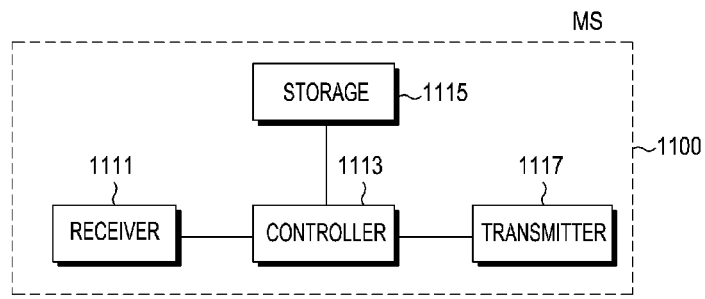
FIG. 11 schematically illustrates an internal structure of a Mobile Station (MS) in a mobile communication system according to an embodiment of the present disclosure.

FIG. 11 schematically illustrates an internal structure of an MS in a mobile communication system according to an embodiment of the present disclosure.

Referring to FIG. 11, an MS 1100 includes a receiver 1111, a controller 1113, a storage 1115, and a transmitter 1117.

The controller 1113 controls the overall operation of the MS 1100. More particularly, the controller 1113 controls the MS 1100 to perform an operation related to an operation of routing data, the operation of which is performed in the manner described with reference to FIGS. 2 to 10. Accordingly, a description thereof will be omitted herein.

The receiver 1111 receives messages under a control of the controller 1113.

The storage 1115 stores the messages received in the receiver 1111 and data used for the overall operation of the MS 1100.

The transmitter 1117 transmits messages under a control of the controller 1113.

While the receiver 1111, the controller 1113, the storage 1115, and the transmitter 1117 are shown in FIG. 11 as separate units, it is to be understood that this is merely for convenience of description. In other words, two or more of the receiver 1111, the controller 1113, the storage 1115, and the transmitter 1117 may be incorporated into a single unit.

Figure 12:
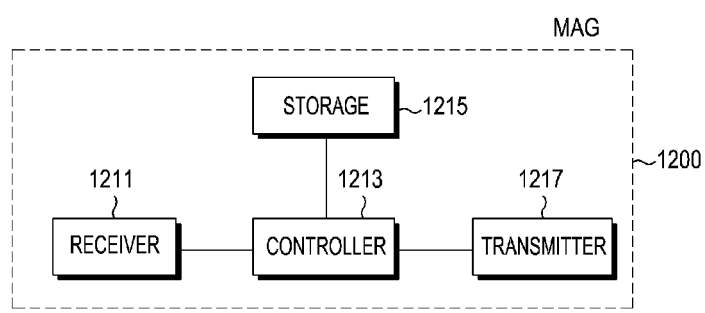
FIG. 12 schematically illustrates an internal structure of a MAG in a mobile communication system according to an embodiment of the present disclosure.

FIG. 12 schematically illustrates an internal structure of a MAG in a mobile communication system according to an embodiment of the present disclosure.

Referring to FIG. 12, a MAG 1200 includes a receiver 1211, a controller 1213, a storage 1215, and a transmitter 1217.

The controller 1213 controls the overall operation of the MAG 1200. More particularly, the controller 1213 controls the MAG 1200 to perform an operation related to an operation of routing data, the operation of which is performed in the manner described with reference to FIGS. 2 to 10. Accordingly, a description thereof will be omitted herein.

The receiver 1211 receives messages under a control of the controller 1213.

The storage 1215 stores the messages received in the receiver 1211 and data used for the overall operation of the MAG 1200.

The transmitter 1217 transmits messages under a control of the controller 1213.

While the receiver 1211, the controller 1213, the storage 1215, and the transmitter 1217 are shown in FIG. 12 as separate units, it is to be understood that this is merely for convenience of description. In other words, two or more of the receiver 1211, the controller 1213, the storage 1215, and the transmitter 1217 may be incorporated into a single unit.

Figure 13:
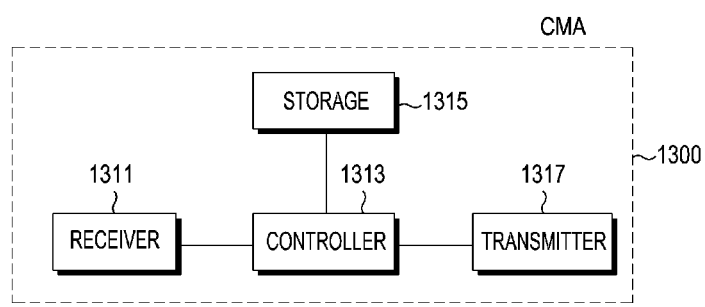
FIG. 13 schematically illustrates an internal structure of a CMA in a mobile communication system according to an embodiment of the present disclosure.

FIG. 13 schematically illustrates an internal structure of a CMA in a mobile communication system according to an embodiment of the present disclosure.

Referring to FIG. 13, a CMA 1300 includes a receiver 1311, a controller 1313, a storage 1315, and a transmitter 1317.

The controller 1313 controls the overall operation of the CMA 1300. More particularly, the controller 1313 controls the CMA 1300 to perform an operation related to an operation of routing data, the operation of which is performed in the manner described with reference to FIGS. 2 to 10. Accordingly, a description thereof will be omitted herein.

The receiver 1311 receives messages under a control of the controller 1313.

The storage 1315 stores the messages received in the receiver 1311 and data used for the overall operation of the CMA 1300.

The transmitter 1317 transmits messages under a control of the controller 1313.

While the receiver 1311, the controller 1313, the storage 1315, and the transmitter 1317 are shown in FIG. 13 as separate units, it is to be understood that this is merely for convenience of description. In other words, two or more of the receiver 1311, the controller 1313, the storage 1315, and the transmitter 1317 may be incorporated into a single unit.

Figure 14:
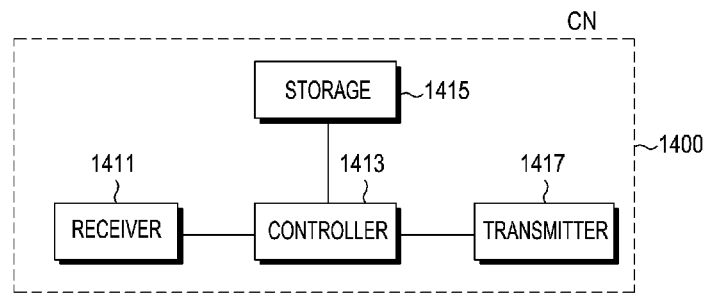
FIG. 14 schematically illustrates an internal structure of a Corresponding Node (CN) in a mobile communication system according to an embodiment of the present disclosure.

FIG. 14 schematically illustrates an internal structure of a CN in a mobile communication system according to an embodiment of the present disclosure.

Referring to FIG. 14, a CN 1400 includes a receiver 1411, a controller 1413, a storage 1415, and a transmitter 1417.

The controller 1413 controls the overall operation of the CN 1400. More particularly, the controller 1413 controls the CN 1400 to perform an operation related to an operation of routing data, the operation of which is performed in the manner described with reference to FIGS. 2 to 10. Accordingly, a description thereof will be omitted herein.

The receiver 1411 receives messages under a control of the controller 1413.

The storage 1415 stores the messages received in the receiver 1411 and data used for the overall operation of the CN 1400.

The transmitter 1417 transmits messages under a control of the controller 1413.

While the receiver 1411, the controller 1413, the storage 1415, and the transmitter 1417 are shown in FIG. 14 as separate units, it is to be understood that this is merely for convenience of description. In other words, two or more of the receiver 1411, the controller 1413, the storage 1415, and the transmitter 1417 may be incorporated into a single unit.

Figure 15:
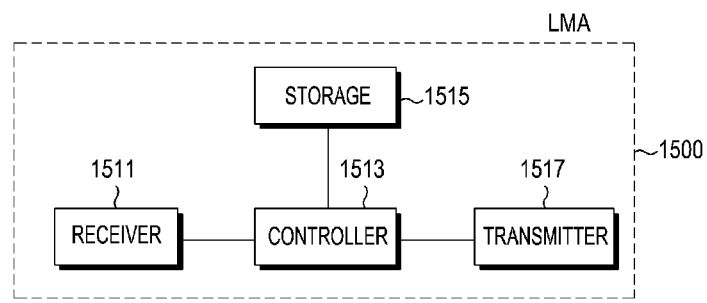
FIG. 15 schematically illustrates an internal structure of an LMA in a mobile communication system according to an embodiment of the present disclosure.

FIG. 15 schematically illustrates an internal structure of an LMA in a mobile communication system according to an embodiment of the present disclosure.

Referring to FIG. 15, an LMA 1500 includes a receiver 1511, a controller 1513, a storage 1515, and a transmitter 1517.

The controller 1513 controls the overall operation of the LMA 1500. More particularly, the controller 1513 controls the LMA 1500 to perform an operation related to an operation of routing data, the operation of which is performed in the manner described with reference to FIGS. 2 to 10. Accordingly, a description thereof will be omitted herein.

The receiver 1511 receives messages under a control of the controller 1513.

The storage 1515 stores the messages received in the receiver 1511 and data used for the overall operation of the LMA 1500.

The transmitter 1517 transmits messages under a control of the controller 1513.

While the receiver 1511, the controller 1513, the storage 1515, and the transmitter 1517 are shown in FIG. 15 as separate units, it is to be understood that this is merely for convenience of description. In other words, two or more of the receiver 1511, the controller 1513, the storage 1515, and the transmitter 1517 may be incorporated into a single unit.

Figure 16:
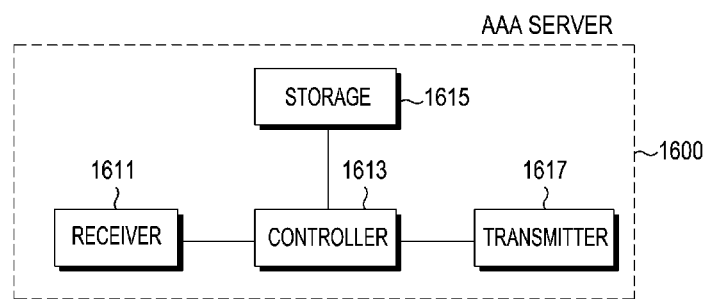
FIG. 16 schematically illustrates an internal structure of an Authorization, Authentication and Accounting (AAA) server in a mobile communication system according to an embodiment of the present disclosure.

FIG. 16 schematically illustrates an internal structure of an AAA server in a mobile communication system according to an embodiment of the present disclosure.

Referring to FIG. 16, an AAA server 1600 includes a receiver 1611, a controller 1613, a storage 1615, and a transmitter 1617.

The controller 1613 controls the overall operation of the AAA server 1600. More particularly, the controller 1613 controls the AAA server 1600 to perform an operation related to an operation of routing data, the operation of which is performed in the manner described with reference to FIGS. 2 to 10. Accordingly, a description thereof will be omitted herein.

The receiver 1611 receives messages under a control of the controller 1613.

The storage 1615 stores the messages received in the receiver 1611 and data used for the overall operation of the AAA server 1600.

The transmitter 1617 transmits messages under a control of the controller 1613.

While the receiver 1611, the controller 1613, the storage 1615, and the transmitter 1617 are shown in FIG. 16 as separate units, it is to be understood that this is merely for convenience of description. In other words, two or more of the receiver 1611, the controller 1613, the storage 1615, and the transmitter 1617 may be incorporated into a single unit.

As is apparent from the foregoing description, the present disclosure enables to route a data packet between an MS and a CN with the shortest data path without additional cost increase and system modification.

The present disclosure enables to route a data packet between an MS and a CN with the shortest data path without a security problem.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for routing data by a corresponding mobility agent (CMA) in a mobile communication system, the method comprising:
    managing mobility for a mobile station (MS) with a mobile access gateway (MAG);
    acquiring, by the CMA from the MAG, a binding update message including a home of address (HoA) interne protocol (IP) address of the MS, a MAG IP address corresponding to an IP address of a corresponding node (CN), an IP address of a local mobility anchor (LMA) for the MS, and a crypto token; and
    routing, by the CMA, a data packet between the CN and the MS through the MAG based on a location of the MS,
    wherein the CMA is mapped to an application server which provides an application service.

2. The method of claim 1, wherein the managing of the mobility for the MS with the MAG comprises:
    performing, by the CMA, an authentication operation with the LMA.

3. The method of claim 1, wherein the routing of the data packet between the CN and the MS through the MAG based on the location of the MS comprises:
    transmitting, by the CMA, upon receiving a data packet which targets the MS from the CN, the received data packet to the MAG, upon which the MAG transmits the data packet to the MS.

4. A method for routing data by a mobile access gateway (MAG) in a mobile communication system, the method comprising:
    managing mobility for a mobile station (MS) with a corresponding mobility agent (CMA);
    providing, by the MAG to the CMA, a binding update message including a home of address (HoA) interne protocol (IP) address of the MS, a MAG IP address corresponding to an IP address of a corresponding node (CN), an IP address of a local mobility anchor (LMA) for the MS, and a crypto token; and
    routing, by the MAG, a data packet between the CN and the MS through the CMA based on a location of the MS,
    wherein the CMA is mapped to an application server which provides an application service.

5. The method of claim 4, wherein the managing of the mobility for the MS with the CMA comprises:
    receiving, by the MAG, a result of an authentication operation which the CMA performs with the LMA from the CMA.

6. The method of claim 4, wherein the routing of the data packet between the CN and the MS through the CMA based on the location of the MS comprises:
    transmitting, by the MAG, a data packet received from the MS to the CMA, upon which the CMA transmits the data packet to the CN.

7. The method of claim 4, wherein the routing of the data packet between the CN and the MS through the CMA based on the location of the MS comprises:
    receiving, by the MAG, a data packet transmitted from the CN from the CMA; and
    transmitting, by the MAG, the data packet to the MS.

8. A method for routing data by a corresponding mobility agent (CMA) in a mobile communication system, the method comprising:
    managing mobility for a mobile station (MS) with a local mobility anchor (LMA);
    acquiring, by the CMA from a mobile access gateway (MAG), a binding update message including a home of address (HoA) internet protocol (IP) address of the MS, a MAG IP address corresponding to an IP address of a corresponding node (CN), an IP address of a local mobility anchor (LMA) for the MS, and a crypto token; and
    routing, by the CMA, a data packet between the CN and the MS through the MAG based on a location of the MS,
    wherein the CMA is mapped to an application server which provides an application service.

9. A method for routing data by a local mobility anchor (LMA) in a mobile communication system, the method comprising:
    managing mobility for a mobile station (MS) with a corresponding mobility agent (CMA); and
    providing, through a mobile access gateway (MAG) to the CMA, a binding update message including a home of address (HoA) internet protocol (IP) address of the MS, a MAG IP address corresponding to an IP address of a corresponding node (CN), an IP address of the LMA for the MS, and a crypto token,
    wherein the CMA is mapped to an application server which provides an application service.

10. The method of claim 9, wherein the managing of the mobility for the MS with the CMA comprises:
    performing, by the LMA, an authentication operation with the CMA.

11. A corresponding mobility agent (CMA) in a mobile communication system, the CMA comprising:
    a controller configured to manage mobility for a mobile station (MS) with a mobile access gateway (MAG);
    a receiver configured to acquire from the MAG a binding update message including a home of address (HoA) interne protocol (IP) address of the MS, a MAG IP address corresponding to an IP address of a corresponding node (CN), an IP address of a local mobility anchor (LMA) for the MS, and a crypto token; and a transmitter/the receiver configured to route a data packet between the CN and the MS through the MAG based on a location of the MS, wherein the CMA is mapped to an application server which provides an application service.

12. The CMA of claim 11, wherein the transmitter/receiver is further configured to perform an authentication operation with the LMA.

13. The CMA of claim 11, wherein the receiver is configured to receive a data packet which targets the MS from the CN, and wherein the transmitter is configured to transmit the received data packet to the MAG, upon which the MAG transmits the data packet to the MS.

14. A mobile access gateway (MAG) in a mobile communication system, the MAG comprising:

a controller configured to manage mobility for a mobile station (MS) with a corresponding mobility agent (CMA);

a transmitter configured to transmit to the CMA a binding update message including a home of address (HoA) interne protocol (IP) address of the MS, a MAG IP address corresponding to an IP address of a corresponding node (CN), an IP address of a local mobility anchor (LMA) for the MS, and a crypto token; and the transmitter/a receiver configured to route a data packet between the CN and the MS through the CMA based on a location of the MS, wherein the CMA is mapped to an application server which provides an application service.

15. The MAG of claim 14, wherein the receiver is configured to receive a result of an authentication operation which the CMA performs with the LMA from the CMA.

16. A corresponding mobility agent (CMA) in a mobile communication system, the CMA comprising:

a controller configured to manage mobility for a mobile station (MS) with a local mobility anchor (LMA);

a receiver configured to acquire, from a mobile access gateway (MAG), a binding update message including a home of address (HoA) internet protocol (IP) address of the MS, a MAG IP address corresponding to an IP address of a corresponding node (CN), an IP address of the LMA for the MS, and a crypto token; and a transmitter/the receiver configured to route a data packet between the CN and the MS through the MAG based on a location of the MS, wherein the CMA is mapped to an application server which provides an application service.

17. The CMA of claim 16, wherein the transmitter/receiver is further configured to perform an authentication operation with the LMA.

18. A local mobility anchor (LMA) in a mobile communication system, the LMA comprising:

a controller configured to manage mobility for a mobile station (MS) with a corresponding mobility agent (CMA); and a transmitter configured to transmit, through a mobile access gateway (MAG) to the CMA, a binding update message including a home of address (HoA) internet protocol (IP) address of the MS, a MAG IP address corresponding to an IP address of a corresponding node (CN), an IP address of the LMA for the MS, and a crypto token, wherein the CMA is mapped to an application server which provides an application service.

19. The LMA of claim 18, further comprising:

a receiver configured to perform an authentication operation with the CMA, wherein the transmitter is further configured to perform the authentication operation with the CMA.

20. A method for routing data by a corresponding mobility agent (CMA) in a mobile communication system, the method comprising:

receiving, by the CMA from a mobile access gateway (MAG), a binding update message including a home of address (HoA) internet protocol (IP) address of a mobile station (MS), a mobile access gateway (MAG) IP address corresponding to an IP address of a corresponding node (CN), an IP address of a local mobility anchor (LMA) for the MS, and a crypto token; and performing, by the CMA, a data packet transmission/reception operation for the MS with the MAG and the CN, wherein the CMA is mapped to an application server which provides an application service.

21. The method of claim 20, further comprising:

transmitting an authentication request message including the HoA IP address, the MAG IP address, and the crypto token to the LMA;

receiving an authentication response message in response to the authentication request message from the LMA; and transmitting a binding ACK message in response to the binding update message to the MAG, wherein the authentication response message and the binding ACK message include a result of an authentication operation which the LMA performs.

22. A method for routing data by a mobile access gateway (MAG) in a mobile communication system, the method comprising:

acquiring, by the MAG, a crypto token for a mobile station (MS) from a local mobility anchor (LMA) or other MAG;

mapping, by the MAG, upon receiving a data packet which targets a corresponding node (CN) from the MS, an internet protocol (IP) address of the CN to an IP address of a corresponding mobility agent (CMA) which is mapped to an application server which provides an application service;

transmitting, by the MAG to the CMA, a binding update message including a home of address (HoA) IP address of the MS, a MAG IP address corresponding to the IP address of the CN, an IP address of the LMA, and the crypto token; and performing, by the MAG, a data packet transmission/reception operation for the MS with the CN.

23. The method of claim 22, further comprising:

receiving a binding ACK message in response to the binding update message from the CMA, wherein the binding ACK message includes a result of an authentication operation which the LMA performs.

24. A method for routing data by a mobile access gateway (MAG) in a mobile communication system, the method comprising:

acquiring, by the MAG, a crypto token for a mobile station (MS) from a local mobility anchor (LMA) or other MAG;

setting, by the MAG, up a tunnel with the other MAG or the LMA;

mapping, by the MAG, upon receiving a data packet which targets a corresponding node (CN) from the MS, an internet protocol (IP) address of the CN to an IP address of a corresponding mobility agent (CMA) which is mapped to an application server which provides an application service;

transmitting, by the MAG to CMA, a binding update message including a home of address (HoA) IP address of the MS, a MAG IP address corresponding to the IP address of the CN, an IP address of the LMA, and the crypto token; and performing, by the MAG, a data packet transmission/reception operation for the MS with the CN.

25. The method of claim 24, further comprising:
receiving a binding ACK message in response to the binding update message from the CMA,
wherein the binding ACK message includes a result of an authentication operation which the LMA performs.

26. A method for routing data by a mobile access gateway (MAG) in a mobile communication system, the method comprising:
acquiring, by the MAG, a crypto token for a mobile station (MS) from a local mobility anchor (LMA) or other MAG;
setting, by the MAG, up a tunnel with the other MAG or the LMA;
receiving, by the MAG, a binding trigger message including a home of address (HoA) internet protocol (IP) address, an IP address of a corresponding node (CN), a MAG IP address corresponding to the IP address of the CN;
transmitting, by the MAG to a corresponding mobility agent (CMA), a binding update message including the HoA IP address of the MS, the MAG IP address, the IP address of the LMA, and a crypto token; and
performing, by the MAG, a data packet transmission/reception operation for the MS with the CMA which is mapped to an application server which provides an application service.

27. The method of claim 26, further comprising:
receiving a binding ACK message in response to the binding update message from the CMA,
wherein the binding ACK message includes a result of an authentication operation which the LMA performs.

28. A method for routing data by a corresponding mobility agent (CMA) in a mobile communication system, the method comprising:
receiving, by the CMA from a mobile access gateway (MAG), a binding update message including a home of address (HoA) internet protocol (IP) address of a mobile station (MS), a MAG IP address corresponding to an IP address of a corresponding node (CN), an IP address of a local mobility anchor (LMA) for the MS, and a crypto token;
performing, by the CMA, upon receiving a data packet from the MAG, a network address translation (NAT) operation; and
transmitting, by the CMA, the data packet through the CN and the MAG to the MS,
wherein the CMA is mapped to an application server which provides an application service.

29. The method of claim 28, further comprising:
transmitting an authentication request message including the HoA IP address, the MAG IP address, and the crypto token to the LMA;
receiving an authentication response message in response to the authentication request message from the LMA; and
transmitting a binding ACK message in response to the binding update message to the MAG,
wherein the authentication response message and the binding ACK message include a result of an authentication operation which the LMA performs.

30. A corresponding mobility agent (CMA) in a mobile communication system, the CMA comprising:
a transmitter/receiver configured to:
receive, from a mobile access gateway (MAG), a binding update message including a home of address (HoA) internet protocol (IP) address of a mobile station (MS), a MAG IP address corresponding to an IP address of a corresponding node (CN), an IP address of a local mobility anchor (LMA) for the MS, and a crypto token, and
perform a data packet transmission/reception operation for the MS with the MAG and the CN,
wherein the CMA is mapped to an application server which provides an application service.

31. The CMA of claim 30,
wherein the transmitter is configured to transmit an authentication request message including the HoA IP address, the MAG IP address, and the crypto token to the LMA,
wherein the receiver is configured to receive an authentication response message in response to the authentication request message from the LMA,
wherein the transmitter is further configured to transmit a binding ACK message in response to the binding update message to the MAG, and
wherein the authentication response message and the binding ACK message include a result of an authentication operation which the LMA performs.

32. A mobile access gateway (MAG) in a mobile communication system, the MAG comprising:
a receiver configured to receive a crypto token for a mobile station (MS) from a local mobility anchor (LMA) or other MAG, and to receive a data packet which targets a corresponding node (CN) from the MS,
a controller configured to map an internet protocol (IP) address of the CN to an IP address of a corresponding mobility agent (CMA) which is mapped to an application server which provides an application service; and
a transmitter configured to transmit to the CMA, a binding update message including a home of address (HoA) IP address of the MS, a MAG IP address corresponding to the IP address of the CN, an IP address of the LMA, and the crypto token,
wherein the transmitter and the receiver are further configured to perform a data packet transmission/reception operation for the MS with the CN.

33. A mobile access gateway (MAG) in a mobile communication system, the MAG comprising:
a transmitter;
a receiver; and
a controller,
wherein the receiver is configured to receive a crypto token for a mobile station (MS) from a local mobility anchor (LMA) or other MAG,
wherein the transmitter and the receiver are configured to set up a tunnel with the other MAG or the LMA,
wherein, after the receiver receives a data packet which targets a corresponding node (CN) from the MS, the controller is configured to map an internet protocol (IP) address of the CN to an IP address of a corresponding mobility agent (CMA) which is mapped to an application server which provides an application service,
wherein the transmitter is configured to transmit, to the CMA, a binding update message including a home of address (HoA) IP address of the MS, a MAG IP address corresponding to the IP address of the CN, an IP address of the LMA, and the crypto token, and wherein the transmitter and the receiver are further configured to perform a data packet transmission/reception operation for the MS with the CN.

34. A mobile access gateway (MAG) in a mobile communication system, the MAG comprising:

a transmitter;
a receiver; and
a controller,
wherein the receiver is configured to receive a crypto token for a mobile station (MS) from a local mobility anchor (LMA) or other MAG,
wherein the transmitter and the receiver are configured to set up a tunnel with the other MAG or the LMA,
wherein the receiver is configured to receive a binding trigger message including a home of address (HoA) internet protocol (IP) address, an IP address of a corresponding node (CN), a MAG IP address corresponding to the IP address of the CN,
wherein the transmitter is configured to transmit, to a corresponding mobility agent (CMA), a binding update message including the HoA IP address of the MS, the MAG IP address, the IP address of the LMA, and a crypto token, and wherein the transmitter and the receiver are further configured to perform a data packet transmission/reception operation for the MS with the CMA which is mapped to an application server which provides an application service.

35. A corresponding mobility agent (CMA) in a mobile communication system, the CMA comprising:

a receiver configured to receive, from a mobile access gateway (MAG), a binding update message including a home of address (HoA) internet protocol (IP) address of a mobile station (MS), a MAG IP address corresponding to an IP address of a corresponding node (CN), an IP address of a local mobility anchor (LMA) for the MS, and a crypto token;

a controller configured to perform a network address translation (NAT) operation after the receiver receives a data packet from the MAG; and a transmitter configured to transmit the data packet through the CN and the MAG to the MS after the controller performs the NAT operation, wherein the CMA is mapped to an application server which provides an application service.

* * * * *